(12) United States Patent
Urbanek

(10) Patent No.: US 7,974,616 B1
(45) Date of Patent: *Jul. 5, 2011

(54) COMMUNICATION DEVICE USAGE EVENT PROFILING

(75) Inventor: Robert E. Urbanek, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/844,688

(22) Filed: Jul. 27, 2010

Related U.S. Application Data

(63) Continuation of application No. 11/449,078, filed on Jun. 8, 2006, now Pat. No. 7,801,518.

(51) Int. Cl.
*H04W 24/00* (2009.01)
*H04M 11/00* (2006.01)
*G06F 15/173* (2006.01)

(52) U.S. Cl. ......... 455/423; 455/405; 455/425; 709/224

(58) Field of Classification Search .................. 455/423, 455/405, 407, 408, 425, 343.5; 709/224
See application file for complete search history.

(56) References Cited

U.S. PATENT DOCUMENTS

| 7,680,899 | B1 | 3/2010 | Barnes et al. | |
|---|---|---|---|---|
| 7,801,518 | B1 | 9/2010 | Urbanek | |
| 2002/0040326 | A1* | 4/2002 | Spratt | 705/26 |
| 2004/0002326 | A1 | 1/2004 | Maher | |
| 2006/0161395 | A1* | 7/2006 | Beam et al. | 702/185 |
| 2006/0211415 | A1* | 9/2006 | Cassett et al. | 455/423 |
| 2007/0206741 | A1* | 9/2007 | Tiliks et al. | 379/106.02 |

OTHER PUBLICATIONS

Patent application entitled "Network Initiation and Pull of Media from Mobile Devices," filed Jun. 2005.
Patent application entitled "Method, Apparatus and System for Monitoring User-Interface Operation," filed Feb. 2005.
Patent Application entitled, "Inventory Management Integrating Subscriber and Targeting Data," by James D. Barnes, et al., filed Jun. 26, 2006 as U.S. Appl. No. 11/474,880.
Patent Application entitled, "Behavioral Analysis Engine for Profiling Wireless Subscribers," by James D. Barnes, et al., filed Nov. 8, 2006 as U.S. Appl. No. 11/557,939.
Patent Application entitled, "Dynamic Advertising Content Distribution and Placement Systems and Methods," by James D. Barnes, et al., filed Apr. 17, 2006 as U.S. Appl. No. 11/405,195.
Patent application entitled "Mobile-Device-Based Coupon Management Systems and Methods," filed Apr. 13, 2006, as U.S. Appl. No. 11/403,614.
Patent Application entitled, "Systems and Methods for State-Based Advertisement Messaging Across Media Types," by James D. Barnes, et al., filed May 22, 2006 as U.S. Appl. No. 11/438,540.

* cited by examiner

*Primary Examiner* — Un C Cho

(57) ABSTRACT

The issues introduced above are addressed by, in accordance with at least some embodiments of the invention, a communication device that includes various hardware and software components. The communication device also comprises instrumentation logic that detects the occurrences of various user usage events and logs such events. The usage events impart information about how a user is actually using the communication device. The logged usage event information can be transmitted to a server (e.g., a data center) for subsequent storage and/or analysis. User behavior profiles can thus be analyzed to determine, for example, services that users seem to prefer.

20 Claims, 2 Drawing Sheets

COMMUNICATION DEVICE USAGE EVENT PROFILING

CROSS-REFERENCE TO RELATED APPLICATIONS

This application is a continuation of and claims priority to U.S. patent application Ser. No. 11/449,078, now U.S. Pat. No. 7,801,518 B1, entitled "Communication Device Usage Event Profiling", filed on Jun. 8, 2006 and issued on Sep. 21, 2010, which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is generally directed to usage event profiling on a communication device (e.g., a cellular telephone). More particularly, the present disclosure relates to detecting usage events indicative of how a user uses a communication device and the transmission of such detected events a remote system for storage and/or analysis.

BACKGROUND OF THE INVENTION

Mobile communication devices, such as cellular telephones, communicate through networks provided by a services provider. Through the networks, the mobile communications devices are able to obtain content from various content providers. For example, users of cellular telephones can download audio clips (e.g., songs) to be played through the phone as a ringer. Various other content can be obtained, including games, software utilities, and images that serve as a background on the phone's display. Various services can also be accessed, including text messaging, email services, news alerts, etc. Providers of such content and services naturally desire to provide content or services that their customers prefer. The content or services that customers want, however, is difficult to ascertain.

SUMMARY OF THE INVENTION

The issues introduced above are addressed by, in accordance with at least some embodiments of the invention, a communication device that includes various hardware and software components. The communication device also comprises instrumentation logic that detects the occurrences of various user usage events and logs such events. The usage events impart information about how a user is actually using the communication device. The logged usage event information can be transmitted to a server (e.g., a data center) for subsequent storage and/or analysis. User behavior profiles can thus be analyzed to determine, for example, services that users seem to prefer.

According to at least one embodiment of the invention, the present disclosure is directed to a communication device that comprises a radio, a processor coupled to the radio, and instrumentation logic coupled to the processor. The instrumentation logic detects usage events associated with the communication device. Each usage event pertains to how a user uses said communication device.

According to another embodiment, the present disclosure describes a system that is separate from, and adapted to, communicate with a communication device. The system comprises a content service configured to be provided to the communication device. The system also comprises a device registry accessible to the content service to store usage event data transmitted to the system from the communication device. The usage event data is indicative of how a user of the communication device has used the communication device.

In yet another embodiment, a method comprises detecting a usage event associated with a person's use of a communication device. The method also comprises storing usage event data on the communication device. The usage event data is indicative of the detected usage events.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1:
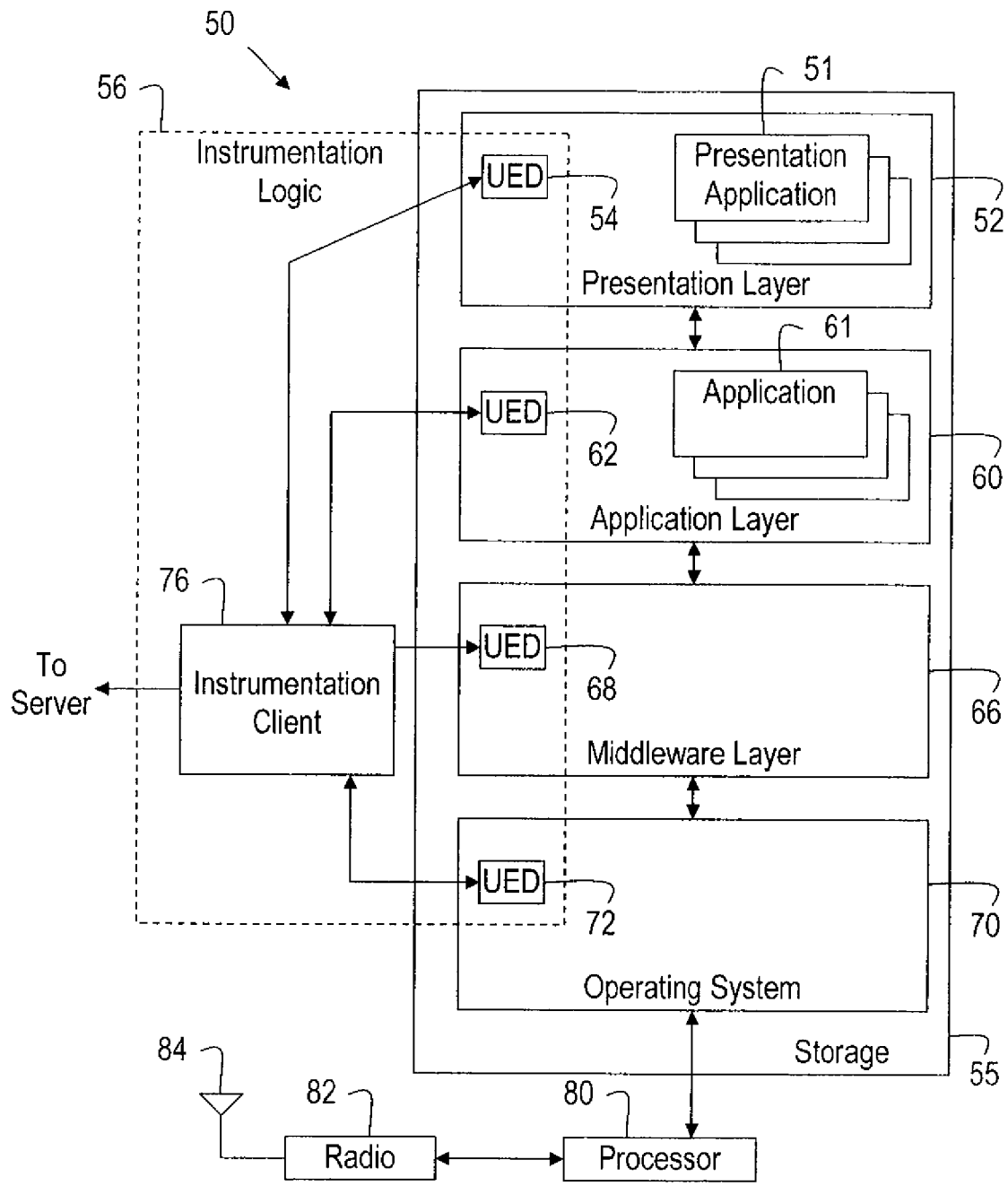
FIG. 1 is a block diagram that depicts a communication device in which behavior profiling is implemented in accordance with various embodiments of the invention.

It should be understood at the outset that although an illustrative implementation of one embodiment of the present invention is illustrated below, the present system may be implemented using any number of techniques, whether currently known or in existence. The present disclosure should in no way be limited to the implementations, drawings, and techniques illustrated below, but may be modified as desired and as would be understood by one of ordinary skill in the art.

Content and service providers for communication devices (e.g., cellular telephones), know that a user of a cellular telephone has downloaded a particular item or used a particular service (e.g., a particular ringer) when that content or service was obtained from that provider. Where multiple providers exist, each provider is only aware of what that user has obtained from that provider. Moreover, the provider generally does not know whether the user of the communication device ever actually uses downloaded content, or for what time period (or with what frequency) particular downloaded content or accessed services are used. For example, the provider of a particular ringer does not know whether the ringer was ever used, whether it was used for a short time period and abandoned, or whether the user was satisfied with the ringer and continues to use it. Embodiments of the present invention provide a mechanism, preferably implemented on the communication device itself, to provide knowledge to the content or services provider of how the user actually uses the communication device. The knowledge extends beyond just what content or services have been requested from a given provider, and includes information regarding what content or services have been requested from other providers, and if and how such content or services were actually used by the user. Such knowledge enables a provider to gain insight regarding customer desires, enabling the provider to more closely tailor offered content and services to better satisfy their customers.

In accordance with various embodiments of the invention, a communication device comprises various hardware and software components, including instrumentation logic that detects the occurrences of various usage events and logs such events. The events so detected comprise any one or more of a number of different types of events including the selection of a particular ringer for the communication device to be played upon the receipt of an in-coming phone call, the selection of a particular image to be the background image on the communication device's display, etc. Such events impart information about how a user is using the communication device, and accordingly, the logging of such events is referred to as "behavior profiling." The logged events can be transmitted to a remote system (e.g., a data center) for subsequent storage and analysis. Each user's behavior profile (or the collective profiles of multiple users) can be analyzed by the remote system to determine, for example, content and services that users prefer.

FIG. 1 shows an illustrative embodiment of the communication device. As shown, the communication device 50 comprises a processor 80 coupled to a wireless modem ("radio") 82. The radio 82 includes, or is associated with, an antenna 84 thereby permitting two-way communications with another communication device, which may be a base station or another communication device like the one illustrated in FIG. 1. In some embodiments, the communication device is, or at least comprises, a mobile communication device such as a cellular telephone.

The processor 80 executes code. Such code is logically organized into various "layers" including, for example, a presentation layer 52, an application layer 60, a middleware layer 66, and an operating system 70. The software comprising layers 52-70 is stored in storage 55 (coupled to processor 80) and is executed by processor 80. The storage 55 comprises volatile memory such as random access memory (RAM), non-volatile storage such as Flash memory, read only memory (ROM), electrically-erasable programmable ROM (EEPROM), a hard disk drive, etc., or combinations thereof.

The operating system 70 can comprise any suitable operating system on which the most or all other software executes. It includes various device drivers for hardware components of the communication device 50 and may further include directory management and other low-level services that are useful to applications. The middleware 66 includes application management services (AMS) software that acts as an intermediary between different applications, both within the communications device and on remote systems. The middleware 66 may include communications protocol "stacks", i.e., software that handles the standard communications protocol details so that applications can employ a communications simple interface. In some software architecture designs, the middleware 66 may be considered to be part of the operating system 70.

One or more applications 61 comprise the application layer 60. Such applications 61 comprise, for example, applications that provide any or all of the following functionality, as well as any of a variety of additional functionality:

Contacts—the management (adding, deleting, editing) of names, address, telephone numbers, etc.

VoiceSMS—functionality that enables the user of the communication device to talk to a user of another communication device without dialing such other user's phone number. This functionality permits the communication device to function similar to a "walkie-talkie"

Picture Mail MMS—functionality that enables sending and receiving of images and the viewing of such images on the communications device Alerts—functionality that alerts the user to events such as missed calls, stock prices reaching a threshold, sports events, etc.

Call History—functionality that stores the identity (phone number, time, etc.) of previously placed calls and incoming calls Music Store—functionality that enables the user of the communication device to download audio Text Messaging—functionality that enables a user exchange text messages with a user of another communication device Media Player—functionality that enables the user to play audio and/or video clips Settings—functionality that enables a user to change various settings (e.g., font, color, type size, etc.)

Dialer—functionality that enables a user to dial a phone number, auto redial, voice-activated dialing, etc.

The presentation layer 52 comprises one or more presentation applications 51 that interact with the applications in the application layer 60 to present audio and/or visual information to a user of the communication device 50. Such presentation applications 51 comprise, for example, applications provide to the user information about contacts, messages, missed alerts, settings, account self-service, etc.

Referring still to FIG. 1, the communication device 50 also comprises instrumentation logic 56 that detects usage events associated with the communication device, logs such usage events, and transfers the usage event logs to a remote system (e.g., a server). In the illustrative embodiment of FIG. 1, the instrumentation logic 56 comprises usage event detectors (UEDs) 54, 62, 68, and 72. One or more UEDs are located in, or associated with, each layer 52, 60, 66, and 70. In the embodiment shown in FIG. 1, the UEDs 54, 62, 68, and 72 are located in, or associated with, the presentation layer 52, the application layer 60, the middleware layer 66, and the operating system 70, respectively. As shown in FIG. 1, the functionality performed by the UEDs is distributed among the various layers. In other embodiments, however, the functionality performed by the UEDs is consolidated and not distributed. While each layer 52, 60, 66, and 70 comprises a UED as shown in FIG. 1, in other embodiments, not every layer comprises a UED.

Each of the UEDs 54, 62, 68, and 72 functions to detect usage events. As explained above, a usage event comprises an event that pertains in some way to how a user uses the communication device 50. Some usage events may pertain to the user's use of a particular type of downloaded content or a use of a particular service from a service provider, while other usage events may not relate to such content or services, but may instead pertain only to the user's configuration or usage of a device. Examples of usage events pertaining to the presentation layer 52 comprise such events as a user-initiated change to how contact information is displayed on the communication device or a user-initiated change to the presentation of alert information. The usage event detector 54 may detect changes to font sizes, changes to display colors, and changes to graphical user interface preferences (e.g., whether text labels, small icons, or large icons are preferred).

Examples of usage events pertaining to the application layer 60 comprise such "in-application" events as a user-initiated change to the selection of a particular audio clip as the communication device's ringer or the selection of a particular graphics image as the device's background image. The usage event detector 62 may detect actions taken within applications running on the device, including changes to alert settings, changes to selected ring tones, and may aggregate events to, e.g., count numbers of Voice SMS messages sent, count text messages received, and count the number of times a game is played.

Examples of usage events pertaining to the middleware layer 66 comprise such events as counting the number of times each application is run, and tracking the first and last execution of each application (to enable determination of how long an application has been used on the communications device and how long since the last time it was used). Usage event detector 68 may detect the initiation of an application's execution and the time at which such initiation occurs.

Examples of usage events pertaining to the operating system 70 comprise such events as turning the communications device on and off, low battery warnings, recharge events, and running out of available memory. Usage event detector 72 may detect system events such as power-on, power-off, low-battery, charging, and out-of-memory errors. The aforementioned list of usage event examples is illustrative only of the described embodiments of the invention. Additional and/or alternative examples of usage events are within the scope of this disclosure.

The logged usage events provide information about the usage of a communication device that would otherwise not be known to providers of content to users of the communication devices. By way of an example and as alluded to above, a cellular telephone service provider will know when a user of a cellular telephone has downloaded a particular ringer from that provider. The service provider, however, without the embodiments disclosed herein would not necessarily know whether the user of the cellular telephone actually used the ringer, and would be unaware of ringers downloaded from other providers. The instrumentation logic 56, and in particular in this example UED 62 in the application layer which enables a user to select a ringer, will detect that the user has actually configured the communication device 50 to use a particular ringer.

The detected usage events are stored (logged) on the communication device 50 (e.g., in the storage 55). The embodiment of FIG. 1 also shows that the instrumentation logic 56 comprises an instrumentation client 76. In some embodiments, the instrumentation client 76 comprises a set of hardware registers that are used to temporarily store detected events until they can be communicated to a remote system. In other embodiments, the instrumentation client 76 comprises code that is executable by the processor 80. The instrumentation client 76 preferably manages the transfer of the stored usage event data to a remote system (shown in FIG. 2). Usage event data comprises data that describes the usage events. For example, a user-initiated change in a ringer would cause UED 62 to generate usage event data that specifies that the user has changed the ringer, the identity of the new ringer, a timestamp, etc. The usage event data transfer by the instrumentation client 76 can be initiated by the client or by the remote system to which the client transfers the data. That is, the client 76 can initiate the transfer or the remote system can request the usage event data to be transferred. In some embodiments, the usage event data can be transferred at pre-defined or programmable intervals (once per hour, once per day, etc.). In other embodiments, the usage event data is transferred asynchronously (i.e., not a specific intervals, but upon request whenever the request happens to be initiated).

In yet other embodiments, based on, for example, usage event data type, some usage event data may be transferred to the remote device at defined intervals (e.g., once per day or another time interval), while other usage event data may be transferred asynchronously such as when or "shortly after" such usage events are detected. The term "shortly after" includes any time period following the detection of the usage event up to, for example, 5 minutes, 10 minutes, 1 hour, etc. In general, "shortly after" is intended to include the usage event data transfer occurring substantially in "real-time" following detection of the usage event, which is application specific and thus can vary from situation to situation. An example of this latter instance (usage event data being transferred upon or shortly after its detection) comprises a user configuring the communication device to use a particular ringer. Upon the user interacting with the communication device (or shortly thereafter) to implement the desired ringer, the usage event (which was detected preferably by the communication device's UED 62) is transferred by the instrumentation client 76 to a remote system. Thus, for some types of the usage events, the remote system would be informed relatively quickly of the occurrence of the event, while for other types of usage events, there would be a more substantial delay before the remote system is informed. In at least some embodiments, the determination as to which types of data to transfer in real-time and which to transfer at defined time intervals is based on which layer 52, 60, 66, and 70 the detected usage event originated. Alternatively, the determination as to which types of data to transfer in real-time and which to transfer at defined time intervals is user-programmable. In one example, presentation layer originating usage events are transferred in real-time, while operating system-based usage events are transferred at defined time intervals.

The instrumentation client 76 can also enable and disable the UEDs 54, 62, 68, and 72 from operating to detect and store usage event data. The enablement and disablement may apply to the UEDs as a group (i.e., the UEDs are all enabled and disabled as a single group) or may apply to the UEDs individually (that is, one UED may be enabled and disabled separately from another UED). In some embodiments, the user of the communication device 50 can interact with the instrumentation client 76 to enable and disable usage event detection as desired.

Figure 2:
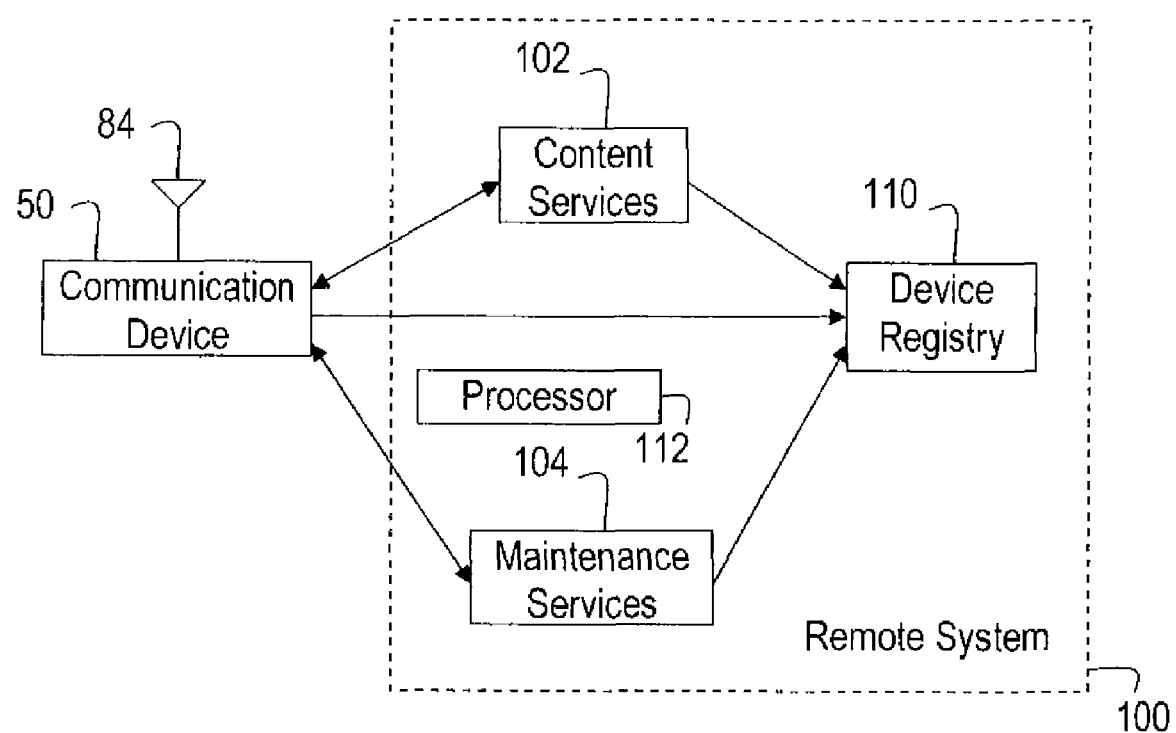
FIG. 2 illustrates a system in which profiled data from a communication device is provided to a server in accordance with various embodiments of the invention.

FIG. 2 illustrates a remote system 100 configured to communicate with the communication device 50. The remote system 100 comprises a first content or services provider 102, a second content or service provider ("maintenance services") 104, and a device registry 110. Other components may be provided as well. In some embodiments, the remote system 100 is a computer, such as a server. The remote system 100 may be a single computer in accordance with some embodiments, while in other embodiments, the remote system 100 comprises a plurality of computers installed in, for example, a data center. Broadly, the content/services provider 102, maintenance services 104, and device registry 110 can be implemented on one computer or each of the content/services provider 102, maintenance services 104, and device registry 110 is implemented on a separate computer as part of a network of computers. These various components (102, 104 and 110) may be implemented in software, hardware, or a combination thereof. As software, the code comprising the software executes on at least one processor 112. The device registry 110 may comprise storage such as non-volatile storage (e.g., a hard disk drive) or volatile memory (e.g., random access memory).

The content/services provider 102 provides downloadable content or a communications-device accessible service available to the communication device 50. An illustrative list of content and services includes:

Audio and/or video streaming on demand

Themes—a collections of background images, icons, fonts, and colors that can be used to customize the communication device's display Music—a service by which a user of a communication device can download music to be used, for example, as a ringer Contact Sync—a service by which a user can synchronize contacts on his or her communication device with a remote set of contacts Visual Voicemail—a voice mail service that also provides images or video of the person leaving the message E-mail—a electronic mail service The maintenance services 104 similarly provide downloadable content or a network-accessible service for use by the communication device 50. An illustrative list of maintenance services includes:

Internet Over The Air (IOTA) Provisioning—IOTA profile downloads to configure various device parameters which can be set by the carrier or by the user, including, e.g., an IP address for a wireless web gateway, an IP address of a home agent used to issue temporary mobile IP addresses, a default home page, etc.

Firmware Maintenance—firmware downloads to update the operating system and middleware of communication devices Diagnostics—software downloads to diagnose problems with a communications device Application Maintenance—software downloads to update applications on communication devices The device registry 110 comprises storage for storing the usage event data transferred to the remote system 100 by the communication device 50. The device registry 110 may also comprise information regarding services purchased or content downloaded to a particular communication device 50. That is, a record is made in the device registry 110 that a user has purchased or downloaded a particular content and/or services (e.g. purchased a new ringer). Such information is provided to the device registry 110 by the content/services provider 102 or maintenance services 104. If, and when, the user actually uses the service on his or her communication device (e.g., configured the communication device to use a newly downloaded ringer), that usage event detected by the communication device and transferred to the remote system 100 for storage in the device registry 110.

In some embodiments, the information (including the usage event data and the content and maintenance services) stored in the device registry is organized according to the users of the communication devices 50. That is, a log is provided in the device registry that indicates the usage event data and content and maintenance services associated with a given communication device and/or user.

The remote system 100, or other system, can analyze the information contained in the device registry for any of a variety of purposes. One such purpose would be to determine a set of content and services preferred by a number of communication device users. For example, a number of users may have not only downloaded a particular song to their communication device 50, but also actually used that song as a ringer. The information in the device registry 110 could be analyzed to make this determination. Based on the determination that a certain song is popular among a significant number of communication device users, a decision could then be made to provide additional songs by the same artist or additional songs of the same type or genre. In general, once knowledge of user likes is assessed (based on information in the device registry 110), the set of content and/or services could be optimized.

While various embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented. Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A communication device, comprising:
a radio to facilitate two-way communications;
a processor coupled to said radio; and
instrumentation logic coupled to said processor, said instrumentation logic comprises a plurality of usage event detectors, wherein each of the plurality of the usage event detectors is associated with a corresponding one of a plurality of software layers of said communication device including a plurality selected from the group consisting of: a presentation layer; an application layer; a middleware layer; and an operating system, and each of the plurality of the usage event detectors detects usage events associated with the corresponding one of the plurality of software layers of said communication device, each usage event pertaining to how a user uses downloaded content or a network-accessible service on said communication device.

2. The communication device of claim 1, wherein each of the plurality of usage event detectors detects at least one different usage event.

3. The communication device of claim 1, wherein the usage events include usage of content downloaded from a first provider and usage of content downloaded from a second, different provider.

4. The communication device of claim 1, wherein the usage event is in a set consisting of a user-initiated change to display preferences, a user-initiated change to alert settings, a user-initiated change to a ring tone, an execution of a downloaded application, and a user action taken within an application running on the communication device.

5. The communication device of claim 4, wherein said instrumentation logic transfers the logged usage events to a system that is separate from said communication device.

6. The communication device of claim 1, wherein said instrumentation logic logs said usage events.

7. The communication device of claim 6, wherein said instrumentation logic causes a first type of usage events to be transferred to the system within a defined time period following their occurrence and said instrumentation logic causes a second type of usage events to be transferred to the system at predefined time intervals.

8. The communication device of claim 1, wherein said instrumentation logic comprises a client executed by said processor to enable and disable at least portions of said instrumentation logic.

9. The communication device of claim 1, wherein at least one of the plurality of usage event detectors is associated with and detects usage events associated with said operating system.

10. The communication device of claim 1, wherein at least one of the plurality of usage event detectors is associated with and detects usage events associated with said application layer.

11. The communication device of claim 1, wherein at least one of the plurality of usage event detectors is associated with and detects usage events associated with said presentation layer.

12. A system separate from, and adapted to, communicate with a communication device, comprising:
   a provider configured to make content or a service accessible to the communication device; and
   a device registry accessible to said provider to store usage event data transmitted to said system from said communication device, said usage event data associated with an operating system and a middleware layer of said communication device and said usage event data indicative of how a user of said communication device has used the content or the service made accessible by the provider to said communication device, the content or the service associated with the operating system or the middleware layer.

13. The system of claim 12, wherein the usage event data is collected by a plurality of usage event detectors on said communication device.

14. The system of claim 13, wherein the usage event data associated with the operating system is collected by one of the plurality of usage event detectors, and wherein the usage event data associated with the middleware layer is collected by a different one of the plurality of usage event detectors.

15. The system of claim 13, wherein each of the plurality of usage event detectors detects at least one different usage event.

16. The system of claim 12, wherein said device registry also stores information pertaining to whether the provider has provided content or a service to the communication device.

17. The system of claim 12 further comprising a second provider configured to make content or a service accessible to the communication device, wherein said device registry also stores usage event data pertaining to how a user of said communication device has used the content or the service made accessible by the second provider of said communication device.

18. A method, comprising:
   detecting usage events with a plurality of usage event detectors, each associated with a corresponding one of a plurality of software layers of a communication device including a plurality selected from the group consisting of: an operating system; a middleware layer; an application layer; and a presentation layer, each of said usage events in a group consisting of changing settings for the communication device and using downloaded content on the communication device;
   storing usage event data on said communication device, said usage event data indicative of said detected usage events; and
   transferring said usage event data to a system separate from said communication device.

19. The method of claim 18, wherein each of the plurality of usage event detectors detects at least one different usage event.

20. The method of claim 18, wherein the usage events include usage of content downloaded from a first provider and usage of content downloaded from a second, different provider.

* * * * *